D. B. GREEN.
REDUCING VALVE.
APPLICATION FILED OCT. 23, 1916.
1,216,985.
Patented Feb. 20, 1917.
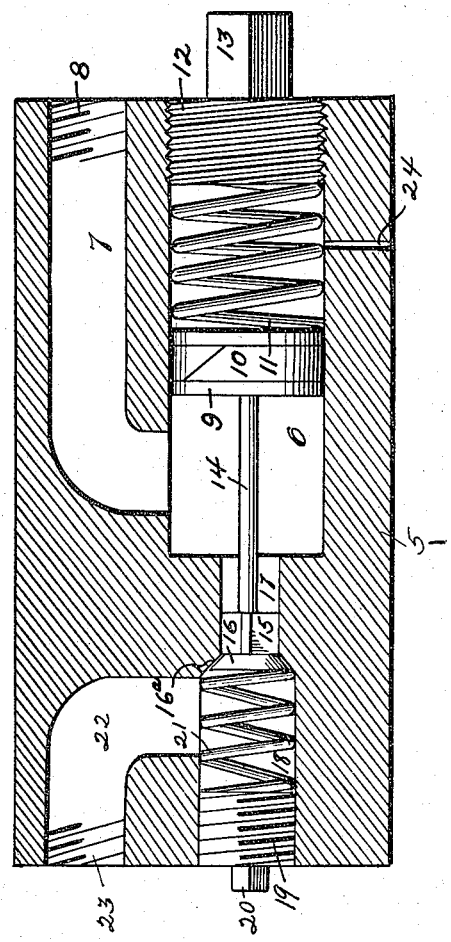
Witness
E. M. Stockman
Inventor
Douglas B. Green
By Shepherd & Campbell
Attorney

UNITED STATES PATENT OFFICE.

DOUGLAS B. GREEN, OF ANNA, ILLINOIS, ASSIGNOR OF ONE-THIRD TO EDWARD SANDERS AND ONE-THIRD TO LEO SANDERS, BOTH OF SAN DIEGO, CALIFORNIA.

REDUCING-VALVE.

1,216,985.

Specification of Letters Patent.

Patented Feb. 20, 1917.

Application filed October 23, 1916. Serial No. 127,284.

*To all whom it may concern:*

Be it known that I, DOUGLAS B. GREEN, a citizen of the United States of America, residing at Anna, in the county of Union and State of Illinois, have invented certain new and useful Improvements in Reducing-Valves, of which the following is a specification.

This invention relates to reducing valves and it has for its object the provision of a simple and inexpensive structure adapted to maintain a predetermined and regulable pressure of reduced value in a pipe line which is connected through said reducing valve with a source of higher pressure.

I am aware of the fact that reducing valves are well-known in the art and I do not claim to be the first to provide a valve adapted to secure the general result hereinbefore set forth. However, as this description proceeds it will be seen that I have devised a new correlation of parts that may be brought into assembled relation at a very small expense and will serve all of the purposes heretofore served by far more expensive devices.

The figure shown in the accompanying drawing is a longitudinal, sectional view of a reducing valve constructed in accordance with the invention.

Referring to the drawing, it will be seen that the improved reducing valve comprises a block 5 which is bored from one end to produce a chamber 6, which chamber is in communication with a port 7 that opens at one end of the block 5 and is internally threaded at 8 to adapt it to have a pipe screwed therein. Slidable in the chamber is a piston 9 which may be provided with one or more piston rings 10 to thereby provide a fluid tight contact with the wall of the chamber 6. A spring 11 bears between the piston 9 and a threaded block 12 which is threaded into the outer end of the chamber 6 and has an angular extension formed thereon so that it may be turned by means of a wrench or other tool to thereby adjust the tension of the spring 11. The piston 9 carries a forwardly extending projection 14 which at certain times thrusts against a spider 15 that is carried by a valve 16. This spider is guided in a channel 17 that establishes communication between the chamber 6 and a chamber 18. The outer end of the chamber 18 opens at the end of the block and has threaded therein a plug 19 having an angular extension 20 by means of which it may be turned to thereby adjust the tension of a spring 21, said spring bearing between the plug 19 and the valve 16. A channel 22 leads from the chamber 18 and opens at the end of the block opposite the end at which the channel 7 opens and the channel 22 is internally threaded at 23 to adapt it to have a pipe threaded therein.

Operation: If the channel 22 be connected to a pipe line containing steam, compressed air or other fluid under pressure, the pressure of the fluid in channel 22 and chamber 18 will tend to maintain the valve 16 closed upon its seat 16ª so that none of the fluid under pressure will flow into channel 7 and to the pipe line, not shown, that is to be connected therewith.

If the plug 12 be screwed into the chamber 6 to put sufficient tension upon spring E to force the piston toward the left in the drawing, the extension 14 will thrust against the spider 15 and move the valve 16ª from its seat, whereupon the pressure from branch 22 may pass through the channel 17 and chamber 6 into the branch 7 and this action will continue until the pressure of spring 21 acting upon valve 16 combined with the pressure of the fluid upon piston 9 is sufficient to overcome spring E whereupon the valve 16 will close and when the pressure in branch 7 is sufficiently reduced to permit the spring 11 to again move the piston toward the left, the valve 16 will be again opened to admit additional pressure to the branch 7 as hereinbefore set forth.

It will be noted that the valve 16 and the extension 14 are not positively connected with each other but that the extension 14 merely thrusts against the valve 16.

A port 24 establishes communication between the atmosphere and the interior of chamber 6 upon the opposite side of the piston from that upon which the pressure acts to thereby prevent either suction or the compression of air within the space occupied by spring 11, from interfering with the proper operation of the piston.

While the elements shown and described are well adapted to serve the purposes for which they are intended, it is to be understood that the invention is not limited to the precise construction set forth but includes within its purview such changes as may fairly come within the spirit of the appended claim.

Having described my invention what I claim is:—

A reducing valve comprising an integral block bored to form a chamber which opens at one end of the block but terminates short of the other end of the block, a plug threaded into the outer end of said chamber, a piston mounted in said chamber, a spring bearing between the piston and the plug, an extension carried by the piston, a second chamber opening at the opposite end of the block and extending part way therethrough and terminating short of the first named chamber, a passage in longitudinal alinement with both of said chambers and establishing communication therebetween, a valve seat formed at the junction of said passage and the last named chamber, a spider carried by said valve and guided in the channel and arranged to be engaged by the extension of the piston, a plug threaded in the outer end of the last named channel, a spring bearing between the plug and the valve and branches leading from each of said chambers to the corresponding end of the block.

In testimony whereof I affix my signature in presence of two witnesses.

DOUGLAS B. GREEN.

Witnesses:
 MARCUS W. ROBBINS,
 LEO SANDERS.

Copies of this patent may be obtained for five cents each, by addressing the "Commissioner of Patents, Washington, D. C."